United States Patent
Knochenmus et al.

(10) Patent No.: US 7,674,161 B2
(45) Date of Patent: Mar. 9, 2010

(54) PORTABLE APPARATUS AND METHOD FOR TENDERIZING MEAT

(75) Inventors: Brian Knochenmus, Lynd, MN (US); Delmer I Davis, Winters, TX (US)

(73) Assignee: Camden Outdoors, LLC, Marshall, MN (US)

(*) Notice: Subject to any disclaimer, the term of this patent is extended or adjusted under 35 U.S.C. 154(b) by 0 days.

(21) Appl. No.: 12/144,458

(22) Filed: Jun. 23, 2008

(65) Prior Publication Data
US 2009/0004957 A1 Jan. 1, 2009

Related U.S. Application Data

(60) Provisional application No. 60/936,828, filed on Jun. 22, 2007.

(51) Int. Cl.
*A22C 9/00* (2006.01)

(52) U.S. Cl. .................................................. 452/141
(58) Field of Classification Search .......... 452/141–144
See application file for complete search history.

(56) References Cited

U.S. PATENT DOCUMENTS

| | | | | |
|---|---|---|---|---|
| 4,237,896 A | * | 12/1980 | Lines | 607/72 |
| 4,495,676 A | * | 1/1985 | Hartmetz, II | 452/141 |
| 4,774,741 A | * | 10/1988 | Bernharadt et al. | 452/141 |
| 5,348,872 A | * | 9/1994 | Lin et al. | 435/440 |
| 6,290,592 B1 | * | 9/2001 | Allen et al. | 452/58 |
| 6,364,759 B2 | * | 4/2002 | Allen et al. | 452/141 |
| 6,471,576 B1 | * | 10/2002 | Ross | 452/58 |

* cited by examiner

*Primary Examiner*—Thomas Price
(74) *Attorney, Agent, or Firm*—Schwegman, Lundberg & Woessner, P.A.

(57) ABSTRACT

A method and apparatus for tenderizing meat by electrical stimulation is characterized by a portable device supplying an electrical current through an electrode or electrodes.

11 Claims, 3 Drawing Sheets

PORTABLE APPARATUS AND METHOD FOR TENDERIZING MEAT

RELATED APPLICATION

This application claims priority under 35 U.S.C. 119(e) from U.S. Provisional Application Ser. No. 60/936,828 filed Jun. 22, 2007, the content of which is incorporated herein by reference in its entirety.

TECHNICAL FIELD

The present application relates an improved method and apparatus for tenderizing meat and, more particularly, to the use of electrical stimulation through a portable device in order to effect tenderizing of wild game meat and other meats.

BACKGROUND

The use of electrical stimulation of a carcass to expedite tenderizing is described by U.S. Pat. No. 2,544,681 to Harsham et al. It is recognized in that patent electrical stimulation results in an accelerated postmortem drop in the pH of the animal tissue and that this accelerated pH drop is beneficial to beef tenderness. Subsequent work in the field has shown that electrical stimulation of muscle rapidly depletes adenosine triphosphate (ATP) from the muscle. This chemical is necessary for muscle contraction to take place. Chilling of muscle (which is a common procedure in the meat packing industry) while the ATP level is still high results in a contraction or shortening of the muscle which produces an undesirable toughness. Depletion of ATP before chilling by electrical stimulation prevents or considerably reduces contraction and provides for much more tender beef. In U.S. Pat. No. 4,358,872 to Van Zandt, a rectal probe is used to tenderize beef, using electrical stimulation.

SUMMARY

Apparatus, systems and methods to make electrical stimulation an available technique to tenderize animal carcasses are provided.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

It is generally accepted that the earlier the voltage stimulation is applied to the carcass after slaughter, the more effective is the stimulation in producing tenderness. This practice has been used widely in the packing industry for years. However, there has never been a device available to practically implement the technology to wild game meat. Wild game meat is a desired table fare that is often viewed as very "natural", lean, and highly nutritious. A frequent complaint of wild game meat is that it is tougher than commercially grown and packed meat products. One inherent disadvantage of wild game is that commercial tenderization techniques have been impractical and unavailable. Additionally, wild game is often harvested during cool periods, when chilling of the muscle occurs naturally. A device which could be used to deplete ATP before the carcass of a wild game animal cools will result in much more tender wild game meat.

An electrode probe, when inserted into the rectum of wild game soon after the animal has expired, makes electrical contact with the moist fecal material in the intestines. This material is a combination of acids, metals, and salts which conduct the applied electrical pulses via the still active nervous system through the carcass. In order to optimize the contact with the slurry of fecal material, a electrode probe in the form of a hollow tube from which extends a solid tip may be employed. In an example embodiment the tube is made of plastic and the tip is made of a metal such as brass. In an alternate embodiment, the tube may be made of metal. The probe may attach directly to a portable control box, or the probe may attach to an insulating handle, which is connected to the control box by a current carrying wire.

In one embodiment, twenty volts may be applied at a repetition rate of thirty pulses per minute for one minute to achieve tenderizing. However, the inventive subject matter is not limited to this specific voltage or timing. Alternate embodiments in which a different voltage is applied and/or a different repetition rate is used are within the scope of the inventive subject matter.

In some embodiments, the circuitry for providing the electrical pulses is housed in a portable control box capable of delivering pulses to probes of various sizes. In one embodiment, probes of at least two sizes are provided—a larger probe for big game and a smaller probe for small game. A conducting probe may also be used. The conducting probe may be inserted into the neck muscles near the spine. Embodiments of the inventive subject matter are not limited to the probe for big game, the probe for small game and the conducting probe. In alternate embodiments, additional probes in an assortment of sizes may be used deliver the electrical pulses.

Figure 1:
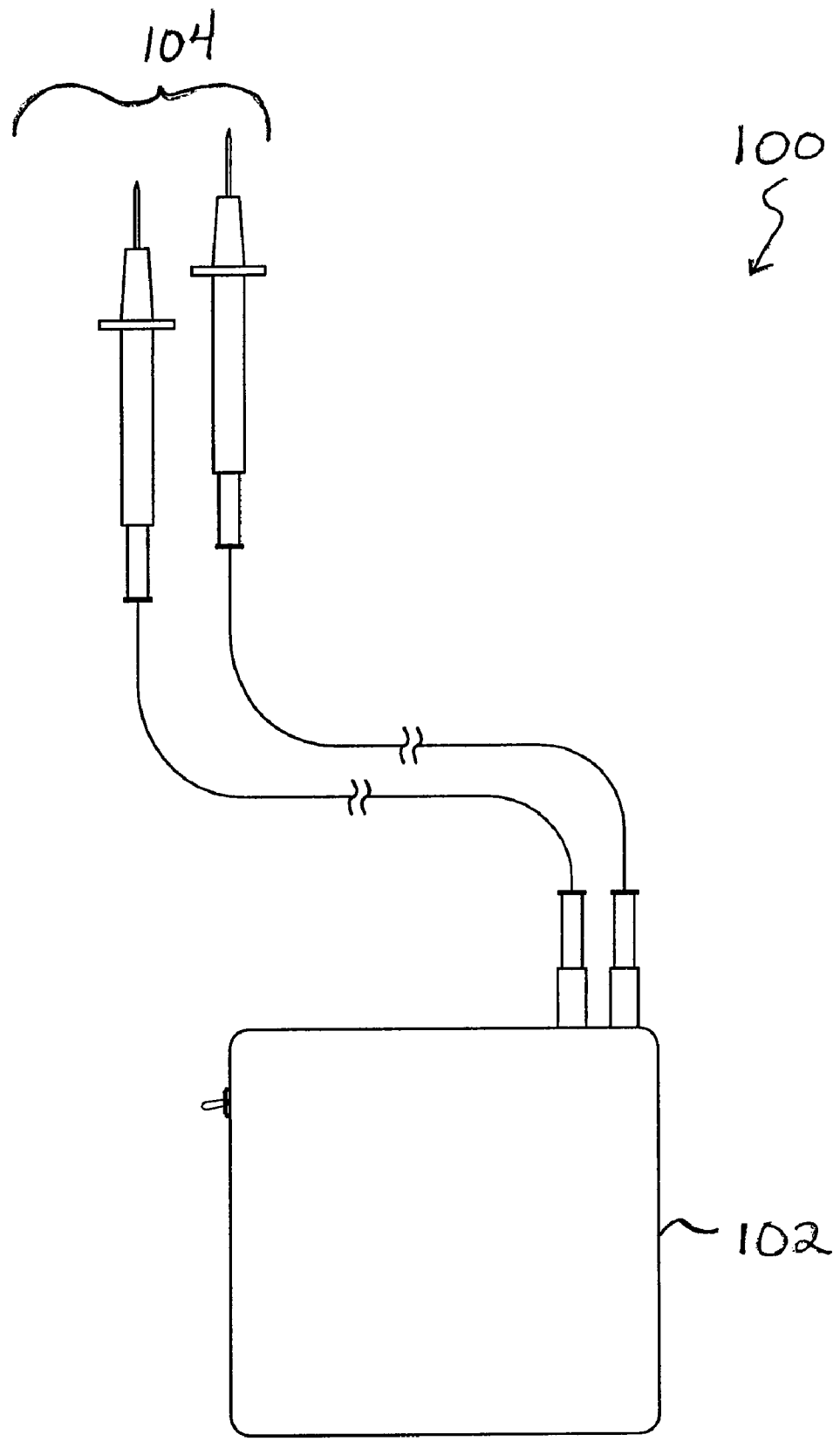
FIG. 1 is a block diagram of an apparatus for tenderizing meat according to an example embodiment.

FIG. 1 is a block diagram of an apparatus for tenderizing meat according to an example embodiment. As shown in FIG. 1, the apparatus for tenderizing meat 100 comprises a portable control box 102 and one or more probes 104. In some embodiments, the portable control box 102 is made of a housing to contain a portable power supply to provide electricity to the probes 104. The portable control box 102 comprises one or more connectors to receive the one or more electrode probes. In one embodiment, the housing is plastic. In an example embodiment the dimensions of the housing are 6×6×3.5 inches. However, embodiments of the invention are not limited to these particular dimensions. Housings of larger or smaller sizes are within the scope of the inventive subject matter.

In some embodiments, the probes 104 are made of plastic with a metal tip. In another embodiment, the probes may be made of metal as well although any suitable material may be used. The solid tip may be made of brass in some embodiments although this too should not be considered a limiting feature and other materials may be used.

In an alternative embodiment, a portable apparatus for use in tenderizing meat on a carcass comprises a portable control box, two or more hollow tubes having first and second ends, and an electrical conductor to connect the portable control box to each one of the hollow tubes and to supply voltage to the tip of the hollow tube. The first end of each one of the two or more hollow tubes comprises a solid tip of electrically conductive metal with a converging tapered forward end that is suitable for insertion into a rectum of a carcass. The second end of each one of the two or more hollow tubes is adapted to connect to the portable control box. In one embodiment, the hollow tubes are made of plastic. In another embodiment, the hollow tubes are made of metal.

Figure 2:
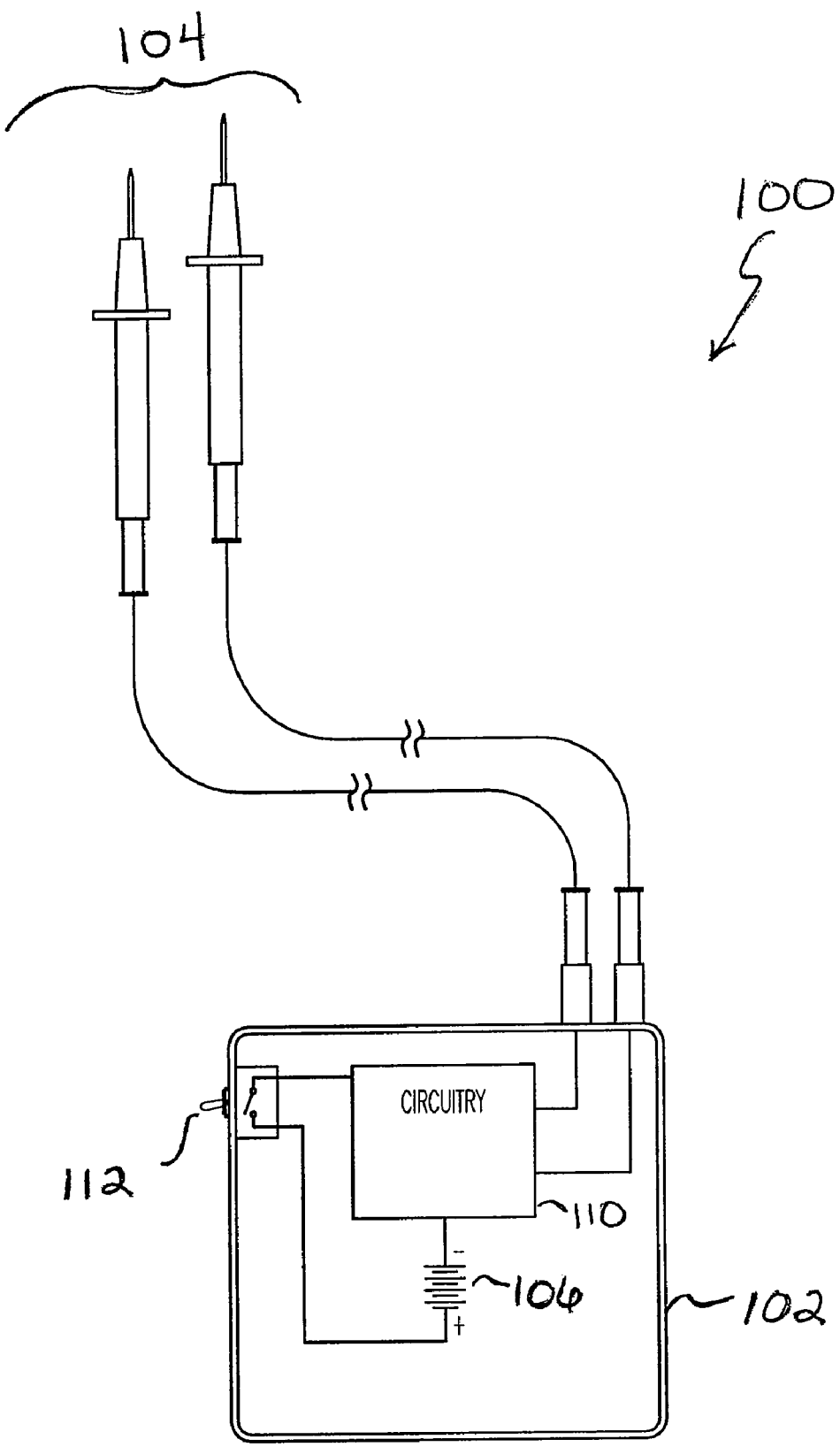
FIG. 2 is a more detailed block diagram of the apparatus of FIG. 1 according to an example embodiment.

FIG. 2 is a more detailed block diagram of the apparatus of FIG. 1 according to an example embodiment. As shown in FIG. 2, the portable control box 102 comprises a portable power source 106, circuitry for providing electrical pulses 110, and a control switch 112.

In one embodiment, the portable power source 106 may be one or more batteries. In another embodiment, the batteries are rechargeable batteries. However, embodiments of the invention subject matter are not limited to batteries as power supplies. Any suitable type of portable supply may be use.

The circuitry for providing electrical pulses 110 applies the electrical stimulation to the probes 104. In an example embodiment, a pulse repetition rate (30 ppm), duty cycle (50%) and voltage level (approximately 20 volts) employed provide for efficient tenderizing of meat by efficiently depleting ATP from the carcass. These parameters permit complete relaxation of the muscles between pulses which a factor in effective ATP depletion. However, the specific voltage, timing, and amperage should not be considered a limiting feature of the inventive subject matter. These parameters may be altered and still provide the effect of tenderizing the meat.

The control switch 112 allows an individual to turn the apparatus for tenderizing meat 100 on and off.

Figure 3:
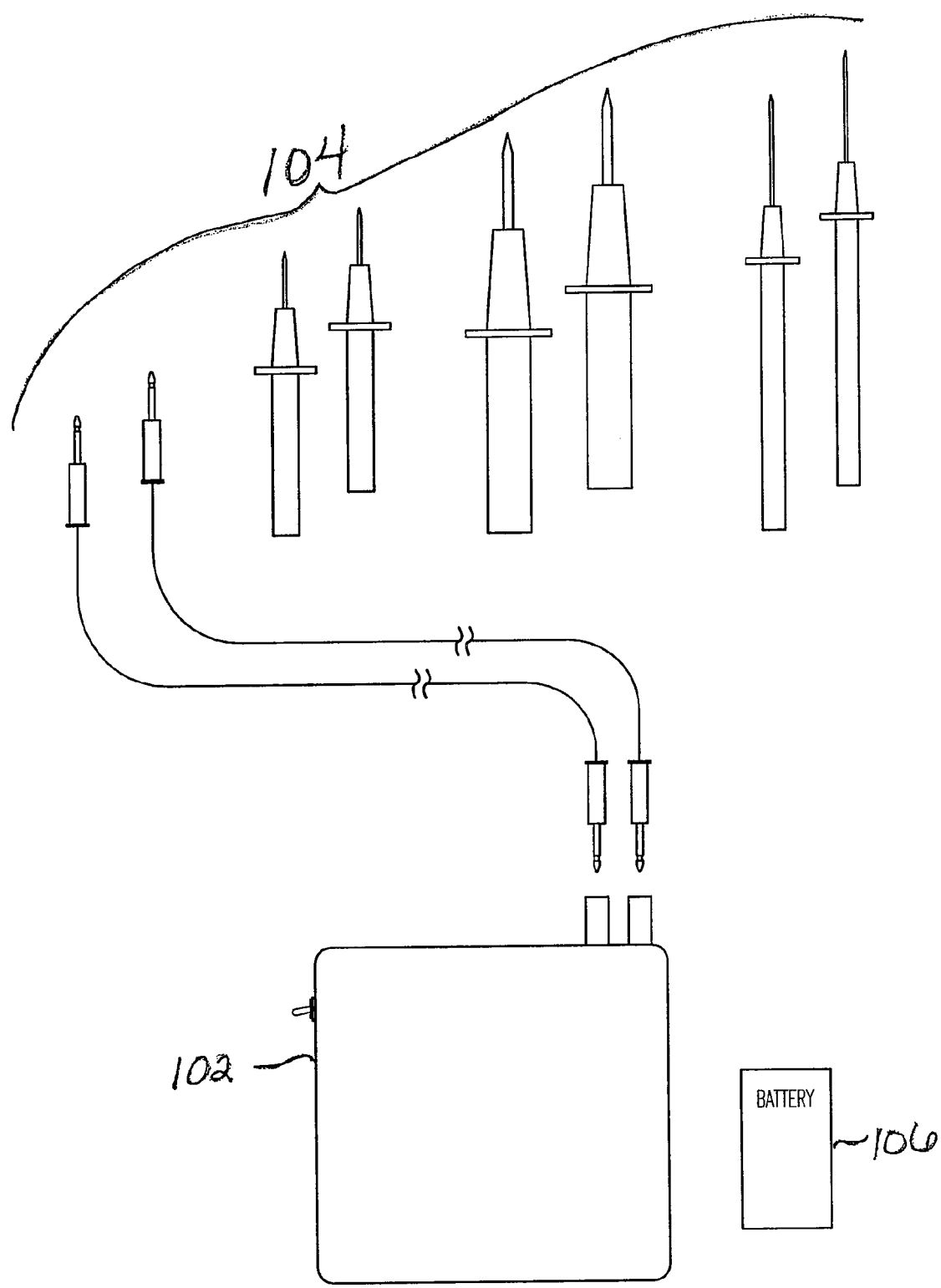
FIG. 3 is a block diagram of a kit for tenderizing meat according to an example embodiment.

FIG. 3 is a block diagram of a kit for tenderizing meat according to an example embodiment. As shown in FIG. 3, the kit for tenderizing meat 120 comprises a portable control box 102, one or more probes 104 and a portable power source 106.

The portable power source 106 may be removable from the portable control box 102. In the example show in FIG. 3, the portable power source 106 is a battery; however, embodiments of the invention are not limited to batteries as a power source.

The one or more probes 104 are detachable from the portable control box 102. The one or more probes 104 may be different sizes so that an individual may select the appropriate size probe for the particular size of wild game to be tenderized.

In one example, an individual selects an appropriate size probe to connect to the portable control box 102 and to insert into the fecal slurry of a carcass' rectal cavity. The applied electrical stimulation may be applied for approximately one minute in the form of a series of low voltage pulses, on the order of estimated twenty volts, having a repetition rate of thirty pulses per minute with a fifty percent duty cycle. When the probes are inserted and power applied immediately after the wild game animal or other animal or bird has expired, the effect of the applied energy is maximized.

The resulting electro-chemical reaction, which causes the low voltage pulses to reach the nearby spine and pass through the nervous system to be distributed efficiently to all of the muscles in the animal. This efficiency is achieved without the use of high voltage and its inherent safety problems.

As noted above, the stimulation is applied as soon as possible the wild game animal expires. In some embodiments, the stimulation begins immediately post mortem; such timing optimizes the depletion of ATP for tenderizing.

The accompanying drawing that forms a part hereof show, by way of illustration and not of limitation, a specific embodiment in which the subject matter may be implemented. The embodiment illustrated is described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense.

Although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72 (b), requiring an abstract that will allow the reader to quickly ascertain the nature of the technical disclosure. It is submitted with the understanding that it will not be used to interpret or limit the scope or meaning of the claims.

We claim:

1. An kit of parts for tenderizing meat, the kit comprising:
a plurality of different size electrode probes, each of the different size electrode probes being detachably couplable to a conductor including a current carrying wire operable to couple the different size electrode probe to a source of electrical stimulation for tenderizing meat, each of the different size probes having a size appropriate for insertion of the different size electrode probe into a particular size wild game carcass,
each of the different size electrode probes including a hollow tube having a first end and a second end, at least one of the different size electrode probes having the first end comprising a solid tip of electrically conductive metal, the solid tip having a converging tapered forward end suitable for insertion into a rectum of the particular size wild game carcass, and the second end adapted be detachably couplable to the conductor including the carrying wire, the conductor operable to electrically couple the solid tip to the source of electrical stimulation; and
a housing to contain a portable power source to supply electricity to the different size electrode probes, the housing including
a portable control box, and
a portable battery powered power supply positioned within the portable control box, the portable battery powered power supply operable to supply electricity used as the source of the electrical stimulation through any set of the different size electrode probes, the electrical stimulation operable to expire adenosine triphosphate (ATP) out of muscle tissue of the wild game carcass which results in accelerated postmortem drop in pH, resulting in an increased tenderness characteristic of one or more portions of meat included in the wild game carcass.

2. The kit of claim 1 wherein the portable battery powered power source comprises at least one battery.

3. The kit of claim 2 wherein the at least one battery is a rechargeable battery.

4. A method of tenderizing wild game meat, the method comprising:
inserting a first probe including an electrically conductive tip into a rectal cavity of a wild game caucus so that electrically conductive tip makes electrical contact with moist fecal material in an intestines of the wild game caucus;

inserting a second probe having an electrically conductive tip into a neck muscles near a spine of the wild game carcass; and using a portable battery operated power source to apply a series of electrical stimulation pulses to the wild game carcass through the first probe and the second probe in order to substantially expire ATP from the muscle tissue of the wild game carcass by causing the series of electrical stimulation pulses to reach the spine and to pass through a nervous system of the wild game carcass so as to be distributed effectively to substantially all of the muscles in the wild game carcass.

5. The method of claim 4 wherein the electrical stimulation comprises a pulse repetition rate of about 30 pulses per minute.

6. The method of claim 4 wherein the electrical stimulation comprises a duty cycle of about 50 percent.

7. The method of claim 4 wherein the electrical stimulation comprises a voltage level of about 20 volts.

8. The method of claim 4 wherein applying electrical stimulation continues for about 1 minute.

9. A portable apparatus for use in tenderizing meat on a carcass, the apparatus comprising:

a portable control box;

a portable battery powered power supply positioned within the portable control box, the portable battery powered power supply operable to supply electricity through one or more probes to a wild game carcass, the supplied electricity operable to expire adenosine triphosphate (ATP) out of muscle tissue of the wild game carcass which results in accelerated postmortem drop in pH, resulting in an increased tenderness characteristic of one or more portions of meat included in the wild game carcass;

each of the one or more probes including a hollow tube having a first end and a second end, at least one of the one or more probes having the first end comprising a solid tip of electrically conductive metal, said tip having a converging tapered forward end suitable for insertion into a rectum of said wild game carcass, and the second end adapted to connect to the portable control box through a first connector including a first current carrying wire, the tip being detachable from the first connector, and the solid tip being of a selectable size that is appropriate for the size of the wild game carcass into which the tip is to be inserted, the first conductor operable to electrically couple the electrically conductive tip to the portable battery powered power supply; and at least a different probe of the one or more probes having the first end comprising a conducting probe having an insertable metal tip, the insertable metal tip operable to be inserted into a neck muscle near a spine of the wild game carcass, the second end of the different probe adapted to connect to the portable control box through a second connector including a second current carrying wire, the second conductor operable to electrically couple the insertable metal tip to the portable battery powered power supply.

10. The portable apparatus of claim 9 wherein the hollow tube is comprised of plastic.

11. The portable apparatus of claim 10 wherein the solid tip and the hollow tube are made of two different metals.

\* \* \* \* \*